US010183625B2

(12) United States Patent
Stiver (10) Patent No.: US 10,183,625 B2
(45) Date of Patent: Jan. 22, 2019

(54) ARMREST WITH ADJUSTABLE CUSHIONS

(71) Applicant: Honda Motor Co., Ltd., Tokyo (JP)

(72) Inventor: Brendan Christopher Stiver, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/427,896

(22) Filed: Feb. 8, 2017

(65) Prior Publication Data
US 2018/0222393 A1 Aug. 9, 2018

(51) Int. Cl.
*B60R 7/04* (2006.01)
*B60R 11/00* (2006.01)
*B60N 2/75* (2018.01)

(52) U.S. Cl.
CPC ............... *B60R 7/04* (2013.01); *B60N 2/793* (2018.02); *B60R 11/00* (2013.01); *B60R 2011/0007* (2013.01); *B60R 2011/0084* (2013.01)

(58) Field of Classification Search
CPC ... B60R 7/04; B60R 11/00; B60R 2011/0007; B60R 2011/0084; B60N 2/4686; B60N 2/793
See application file for complete search history.

(56) References Cited

U.S. PATENT DOCUMENTS

| 6,676,212 B1 | 1/2004 | Amirault |
| 7,104,580 B2 | 9/2006 | Clark et al. |
| 2009/0026197 A1 | 1/2009 | Chou et al. |

FOREIGN PATENT DOCUMENTS

| EP | 1524155 A1 | 4/2005 | |
| EP | 1854672 A2 | 11/2007 | |
| WO | WO-2007084316 A2 * | 7/2007 | ............. B60N 3/101 |

* cited by examiner

*Primary Examiner* — D Glenn Dayoan
*Assistant Examiner* — Melissa A Black
(74) *Attorney, Agent, or Firm* — Honda Patents & Technologies North America, LLC; Mark E. Duell (57) ABSTRACT

A center console for a vehicle is disclosed that includes a base, a storage compartment disposed within the base having an upwardly facing opening, and a cover hingedly connected to the base for selectively covering the opening of the storage compartment. The cover includes an outer cover section and an adjustable center cover section disposed within the outer cover section. The adjustable center cover section is movable between a first position and a second position.

16 Claims, 13 Drawing Sheets

ARMREST WITH ADJUSTABLE CUSHIONS

TECHNICAL FIELD

The embodiments disclosed herein are related covers for storage receptacles, such as those applied to center consoles between seats in a motor vehicle.

BACKGROUND

Industry trends are to apply center consoles to motor vehicles with armrests and storage trays that slide and rotate in almost every direction. These sliding trays can be susceptible to damage, debris, and dirt. Therefore, there is a need for an improved center console that allows the vehicle user to choose between using the center console as an armrest or a tray for storage.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a center console for a vehicle includes a base, a storage compartment disposed within the base having an upwardly facing opening, and a cover hingedly connected to the base for selectively covering the opening of the storage compartment. The cover includes an outer cover section and an adjustable center cover section disposed within the outer cover section. The adjustable center cover section is movable between a first position and a second position.

According to another aspect, a cover for a storage receptacle includes an outer cover section and an adjustable center cover section disposed within the outer cover section. The adjustable center cover section is movable between a first position and a second position.

According to yet another aspect, an actuator for raising and lowering an adjustable center cover section disposed within an outer cover section of a cover for a storage receptacle, the adjustable center cover section movable between a first position and a second position, includes a rotatable carrier rotatable about a central axis, the rotatable carrier having at least one helical guide rail disposed in a vertical wall of the rotatable carrier, a lower surface of the adjustable center cover section in engagement with a horizontal top surface of the rotatable carrier.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
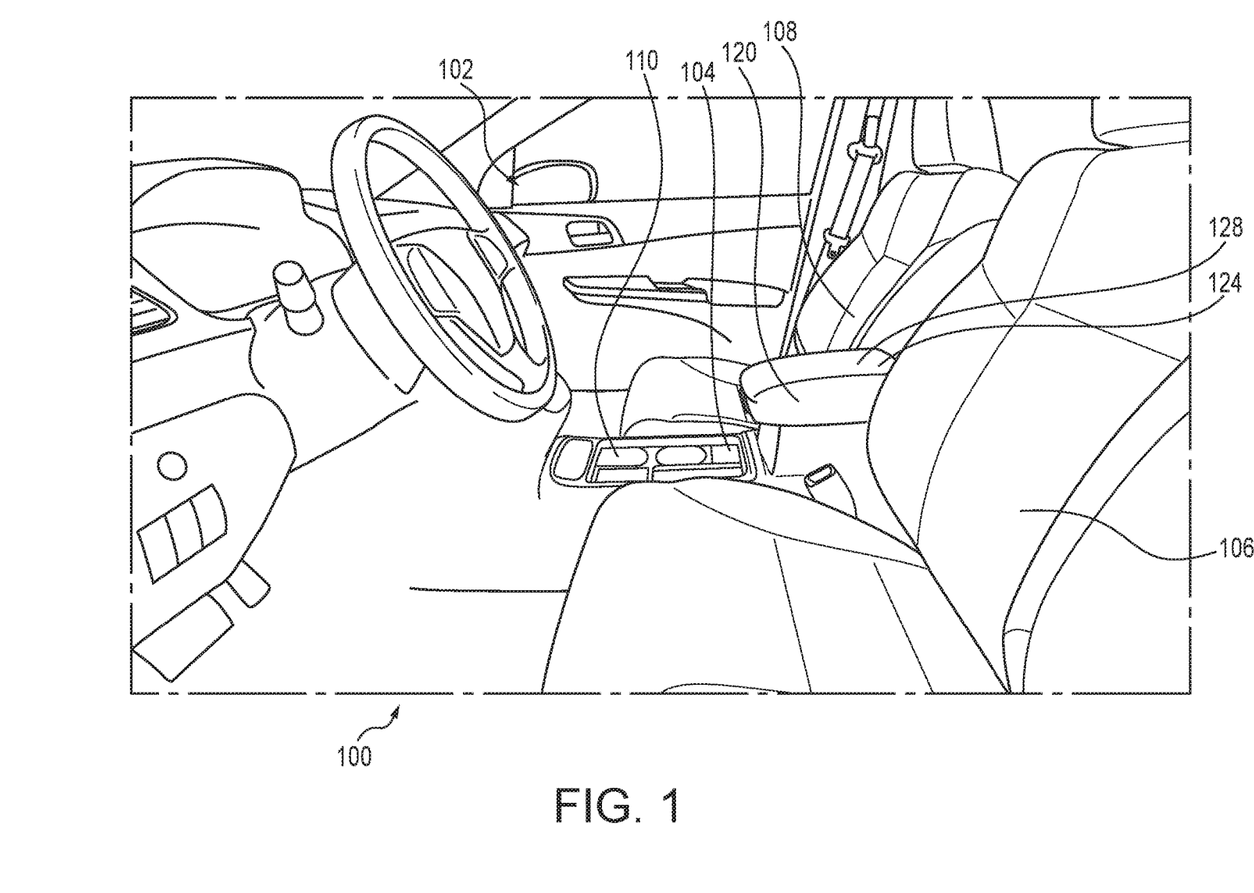
FIG. 1 is side view of the interior of a motor vehicle.
Figure 2:
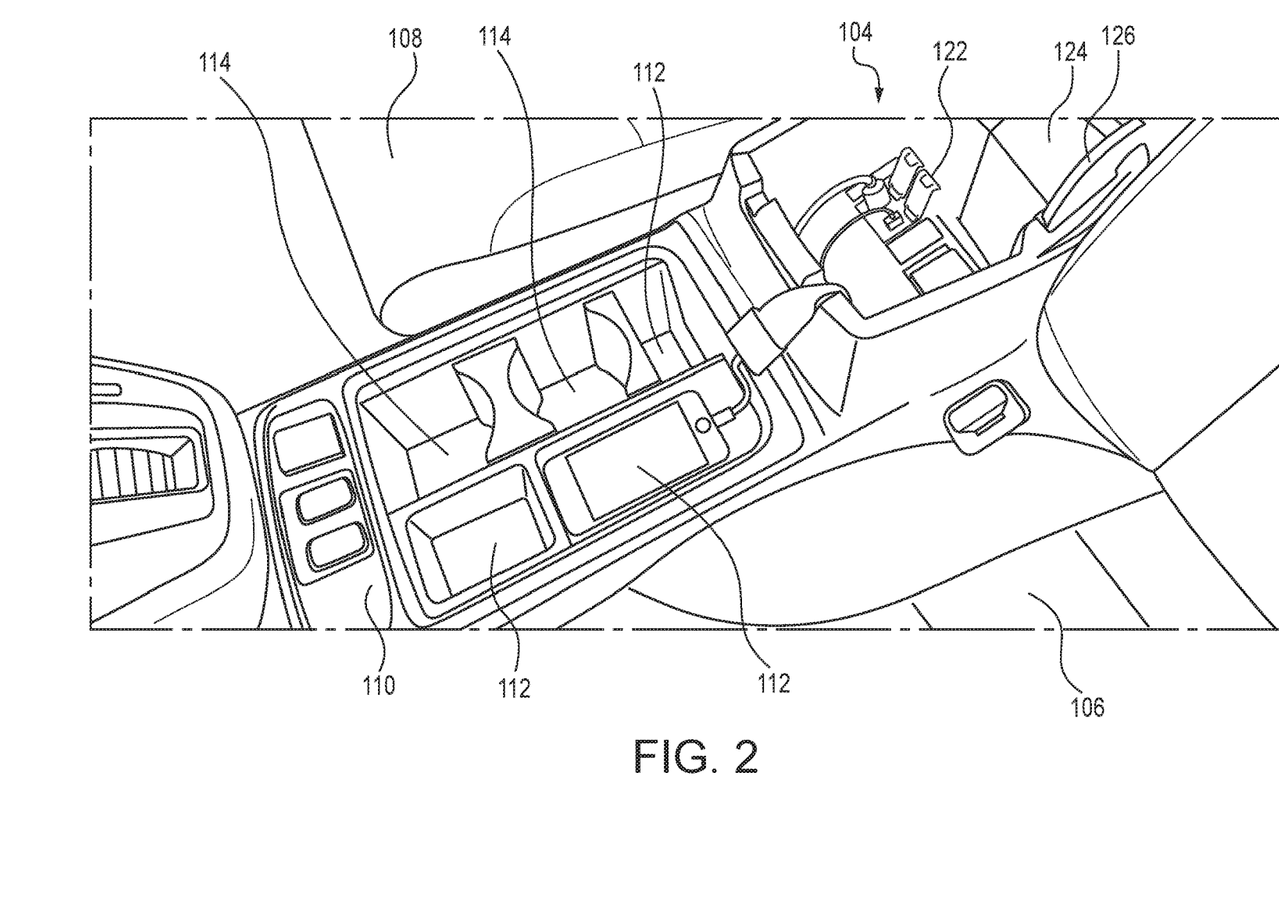
FIG. 2 is a perspective view of a center console of the motor vehicle.

FIGS. 1-2 illustrate an embodiment of a center console 104 positioned in the interior 102 of a motor vehicle 100 located between the front driver's seat 106 and the front passenger's seat 108. The center console 104 may include a forward portion 110 including small storage trays 112 and cup holders 114. Additionally, the center console 104 may include a rearward portion 120 including a storage compartment 122 that is covered by a cover 124 connected to the center console 104 by a hinge 126 or any other suitable connection mechanism. In the illustrated embodiment, the cover 124, when in the closed position, includes an engagement surface 128 so that the cover 124 may function as an armrest.

Figure 3:
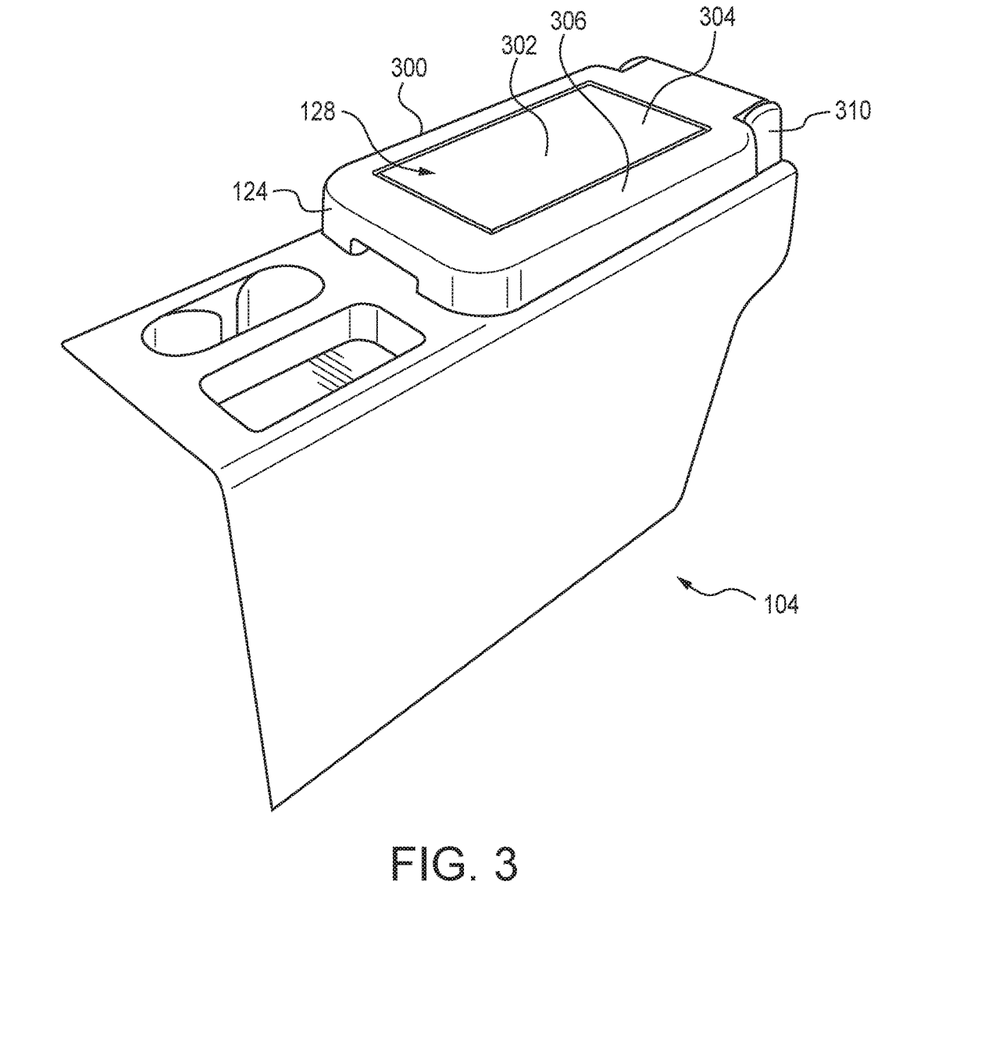
FIG. 3 is a schematic view of a center console of a motor vehicle with an adjustable center cover section in a first position.
Figure 4:
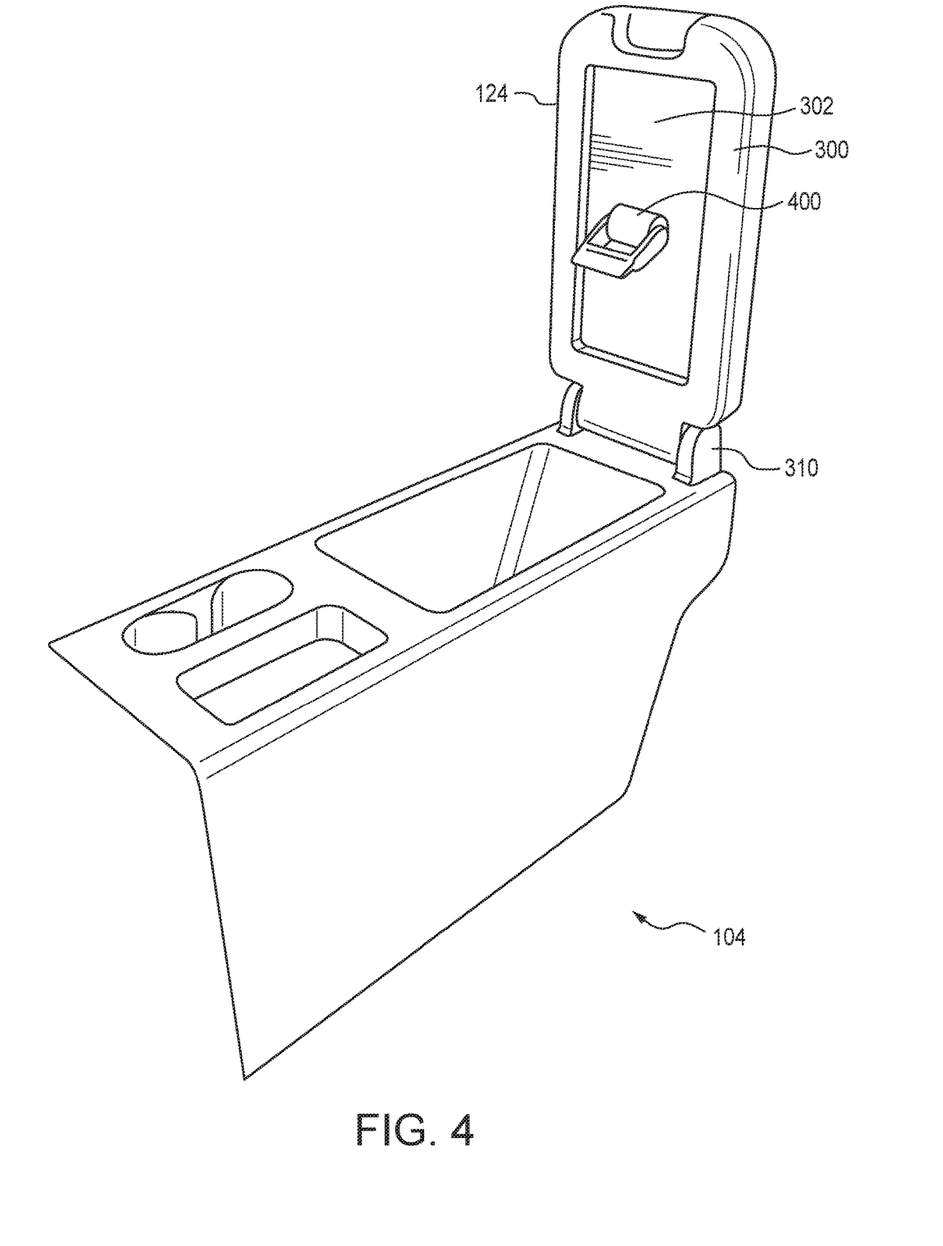
FIG. 4 is a schematic view of the center console of a motor vehicle with cover in an open position.
Figure 5:
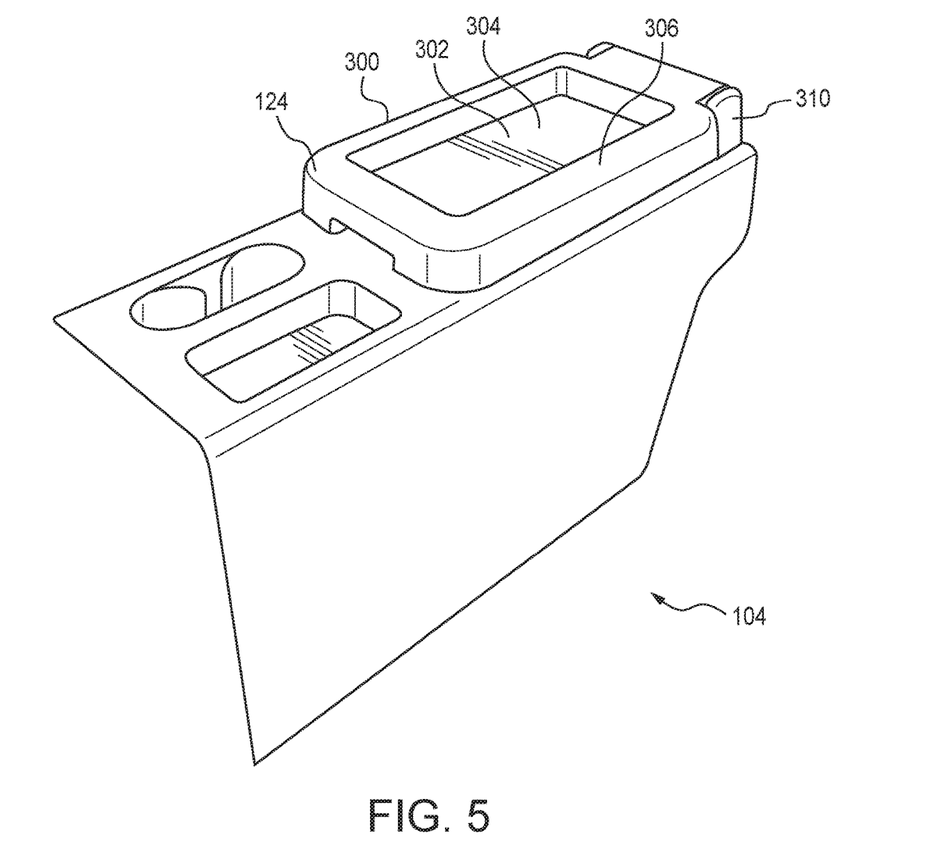
FIG. 5 is a schematic view of the center console of a motor vehicle with an adjustable center cover section in a second position.

FIGS. 3-5 illustrate one embodiment of the center console 104 with a cover 124 that covers the storage compartment 122 when in a closed position as illustrated in FIGS. 3 and 5, and provides access to the storage compartment 122 when raised in an open position as illustrated in FIG. 4. The cover 124 may be removable, or, as shown in the embodiments illustrated in FIG. 3-5, attached via a hinge 310 of the type known to those skilled in the art. The cover 124 includes an outer cover section 300 and an adjustable center cover section 302 disposed within the outer cover section 300. The adjustable center cover section 302 includes an upper surface 304 that is movable between a first position, shown in FIG. 3, and a second position, shown in FIG. 5. In the first position, the upper surface 304 is flush with the upper surface 306 of the outer cover section 300 of the cover 124 so that the cover 124 may operate as an armrest. The upper surfaces 304, 306 of the adjustable center cover section 302 and the outer cover section 300 together constitute an engagement surface 128 that is visible to a user of the motor vehicle 100. In the second position, the adjustable center cover section 302 is vertically recessed relative to the outer cover section 300 such that the upper surface 304 of the adjustable center cover section 302 is recessed relative to the upper surface 306 of the outer cover section 300. In the second position, the cover 124 may operate as a tray for receiving a purse, CD's, food, and the like. The adjustable center cover section 302 may be raised and lower by actuating an actuator 400 on the cover 124.

Figure 6:
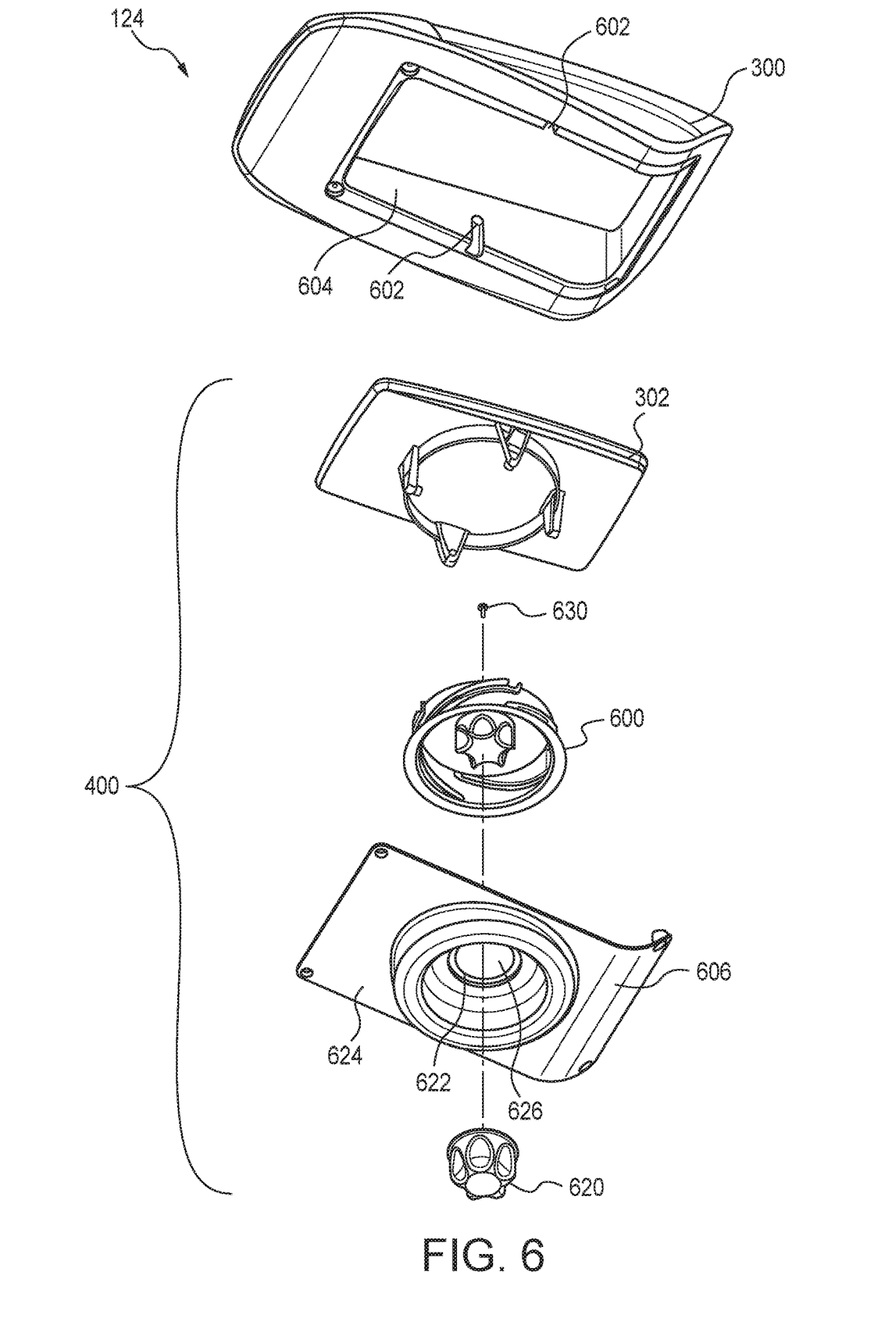
FIG. 6 is an exploded view of an embodiment of a cover of a center console of a motor vehicle.
Figure 7:
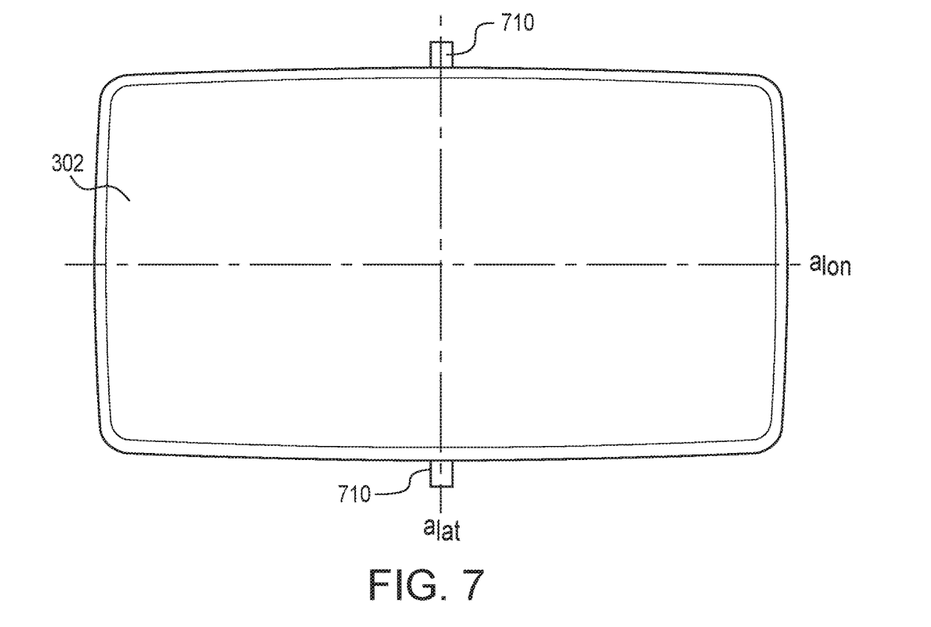
FIG. 7 is a top view of an embodiment of an adjustable center cover section.
Figure 8:
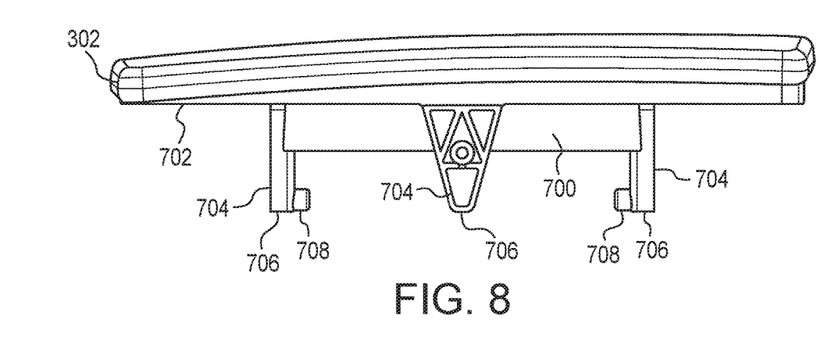
FIG. 8 is a side view of the embodiment of the adjustable center cover section.
Figure 9:
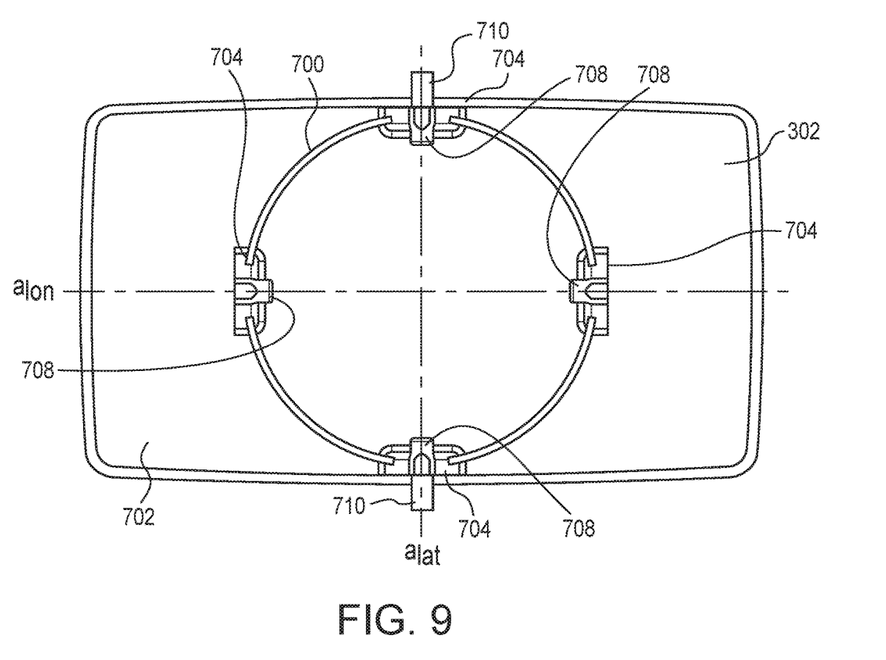
FIG. 9 is a bottom view of the embodiment of the adjustable center cover section.
Figure 10:
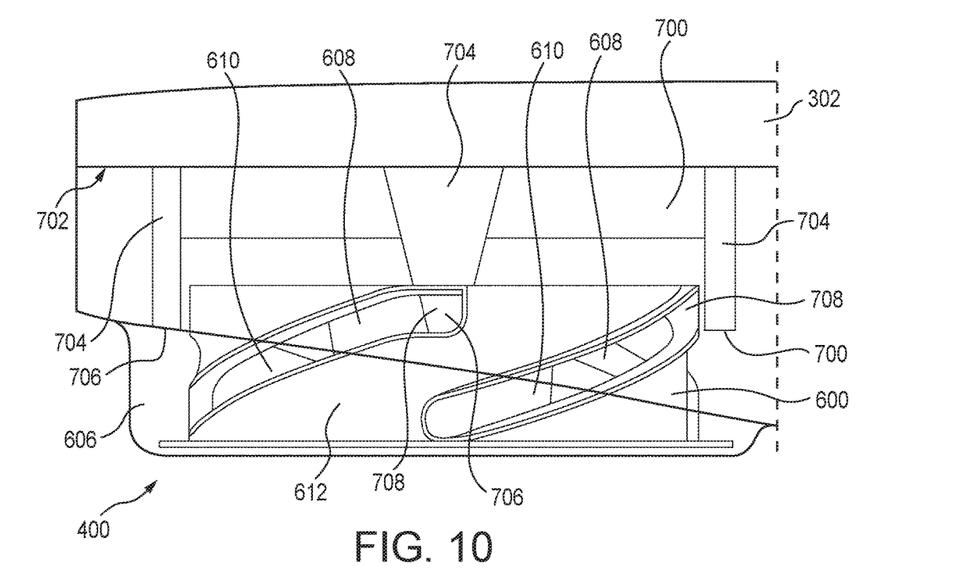
FIG. 10 is a side schematic view of an embodiment of a height adjustment actuator for the adjustable center cover section.
Figure 11:
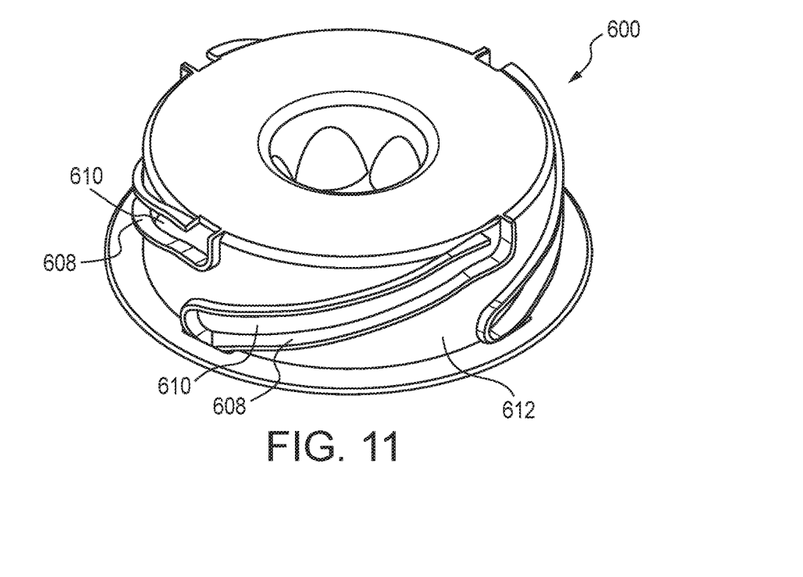
FIG. 11 is a perspective view of an embodiment of a rotatable carrier of the height adjustment actuator.
Figure 12:
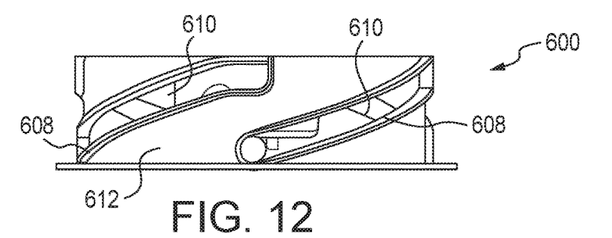
FIG. 12 is a side view of the embodiment of the rotatable carrier of the height adjustment actuator.
Figure 13:
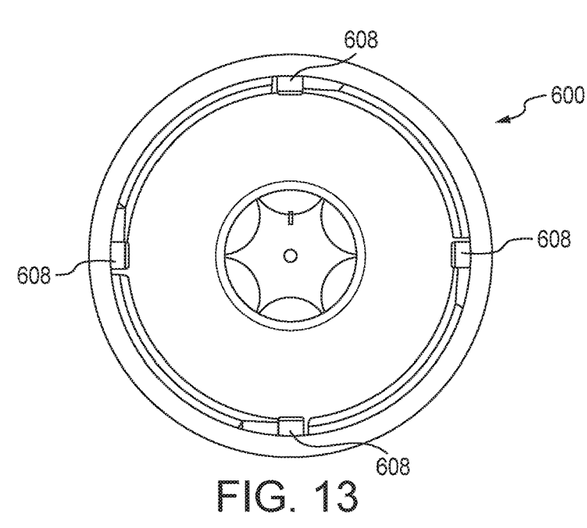
FIG. 13 is a top view of the embodiment of the rotatable carrier of the height adjustment actuator.
Figure 14:
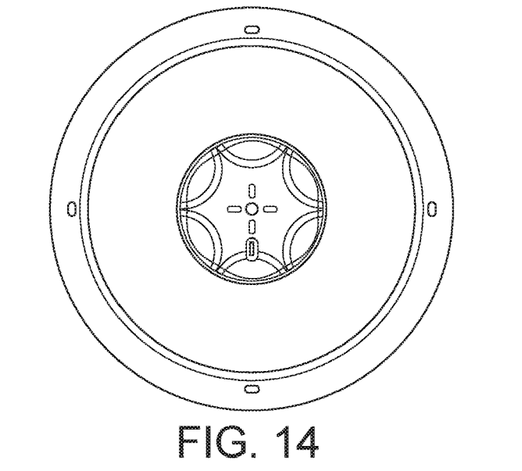
FIG. 14 is a bottom view of the embodiment of the rotatable carrier of the height adjustment actuator.

FIGS. 6-19 illustrate the construction and operation of one embodiment of the actuator 400 in more detail. FIG. 6 is an exploded view of the cover 124. FIGS. 7-9 illustrate the adjustable center cover section 302 in greater detail. The adjustable center cover section 302 includes a circular flange 700 extending from a bottom surface 702 of the adjustable center cover section 302. Clips 704, of which there are four in the embodiment illustrated in FIGS. 7-9, two of which are located along a lateral axis $a_{lat}$, and two of which are located along a longitudinal axis $a_{lon}$, extend downwardly from the bottom surface 702 of the adjustable center cover section 702 and are integrally formed with the circular flange 700. Located at the distal end 706 of each of the clips 704 is an inwardly extending pin 708. The inwardly extending pins 708 are disposed within a rotatable carrier 600, shown in FIG. 6 and described in greater detail below. The adjustable center cover section 302 also includes two outwardly extending pins 710 that extend laterally from the clips along axis $a_{lat}$. The outwardly extending pins 710 are disposed within slots 602 located along an inner surface 604 of the outer cover section 300 to limit and control movement of the adjustable center cover section 302 between the first and second positions.

The adjustable center cover section 302 rests on top of a rotatable carrier 600, which in turn rests on top of and rotates on an under cover 606. FIGS. 10-14 illustrate one embodiment of the rotatable carrier 600, which operates to raise and lower the adjustable center cover section 302 as part of the actuator 400. The rotatable carrier 600 includes a number of helical guide rails 608 equal to the number of inwardly extending pins 708 of the adjustable center cover section 302. In the embodiment illustrated in FIGS. 10-14, the rotatable carrier 600 includes four helical guide rails 608. The helical guide rails 608 are inclined slots 610 in the sidewall 612 of the rotatable carrier 600. As the rotatable carrier 600 is rotated in a first rotational directional, such as a counterclockwise direction as viewed from below in FIGS. 10-14, the inwardly extending pins 708 of the adjustable center cover section 302 are raised up the inclined slots 610, thus raising the adjustable center cover section 302 to the first position illustrated in FIG. 3. As the rotatable carrier 600 is rotated in an opposite second rotational direction, such as in a clockwise direction as viewed from below in FIGS. 10-14, the inwardly extending pins 708 of the adjustable center cover section 302 are lowered down the inclined slots 610, thus lowering the adjustable center cover section 302 to the second position illustrated in FIG. 5.

Figure 15:
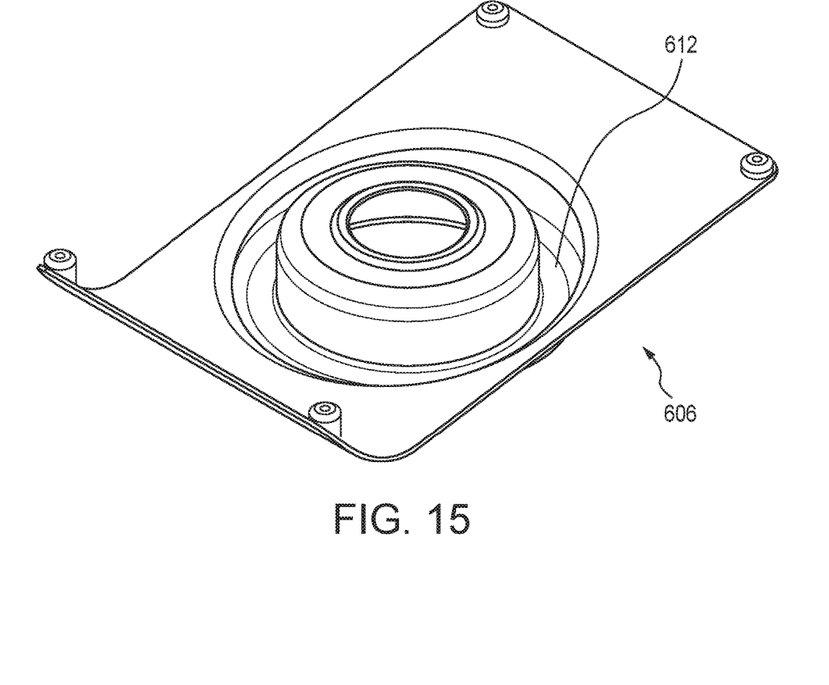
FIG. 15 is a perspective view of an embodiment of an under cover of the adjustable center cover section.
Figure 16:
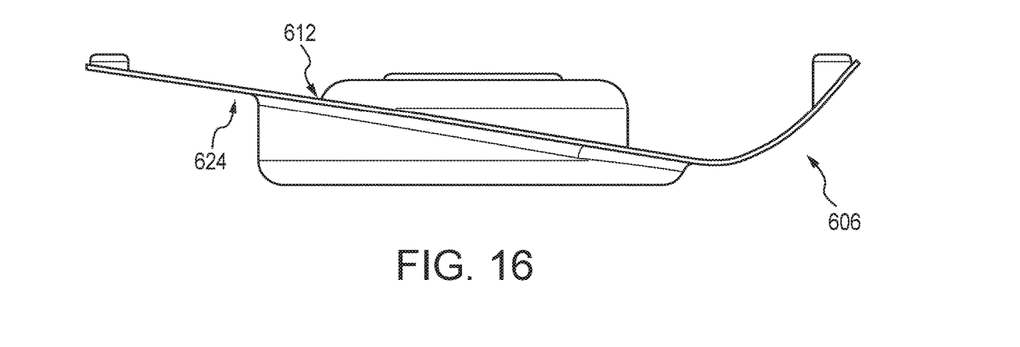
FIG. 16 is a side view of the embodiment of the under cover of the adjustable center cover section.
Figure 17:
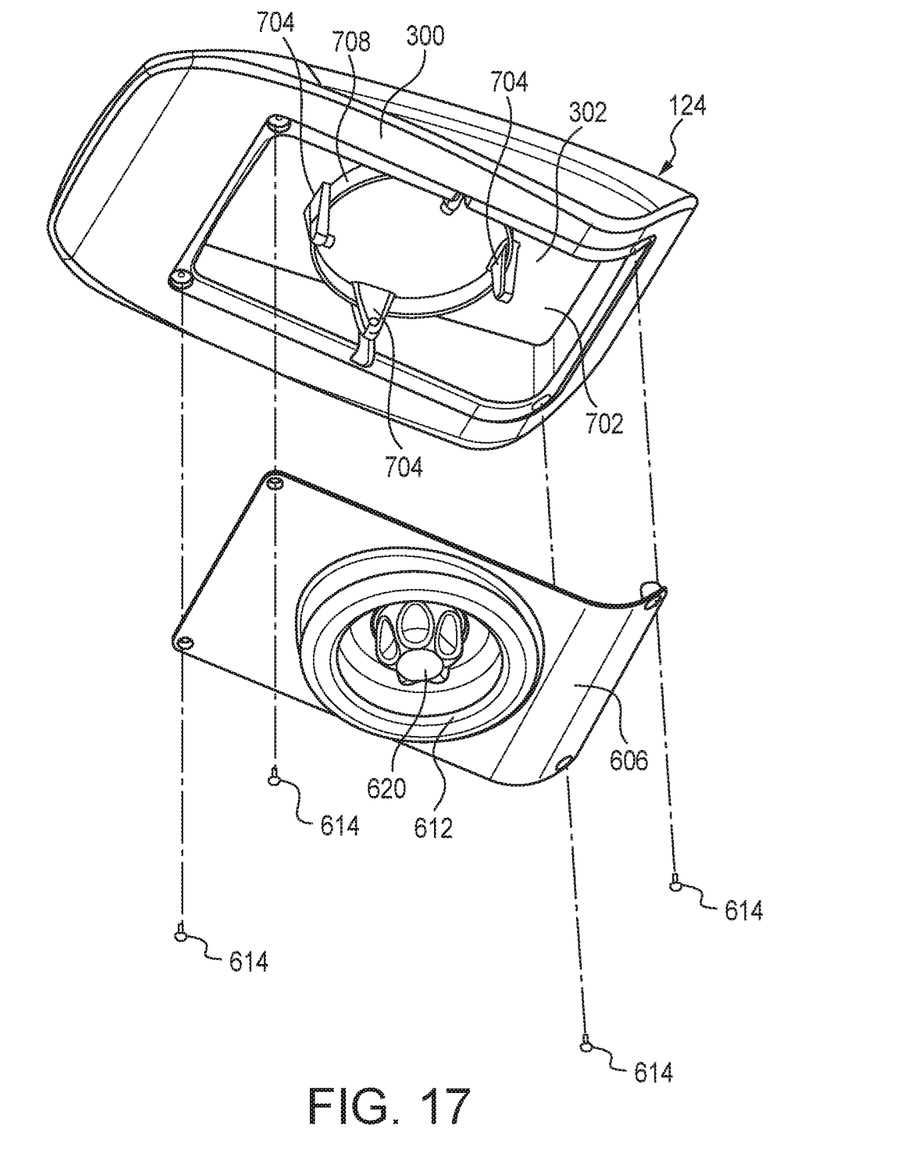
FIG. 17 is an exploded view of the embodiment of the under cover installed on the outer cover section.

FIGS. 15-17 illustrate the under cover 606 in more detail. The under cover 606 includes a circular molded surface 612 for receiving the rotatable carrier 600. The rotatable carrier 600 is free to rotate in the circular molded surface 612. The under cover 606 is, in turn, attached to the outer cover section 300 by fasteners 614, such as screws, bolts, rivets, or any other suitable fastener. As illustrated in FIG. 17, the embodiment shown includes four fasteners 614 for securing the under cover 606 to the outer cover section 300.

Figure 18:
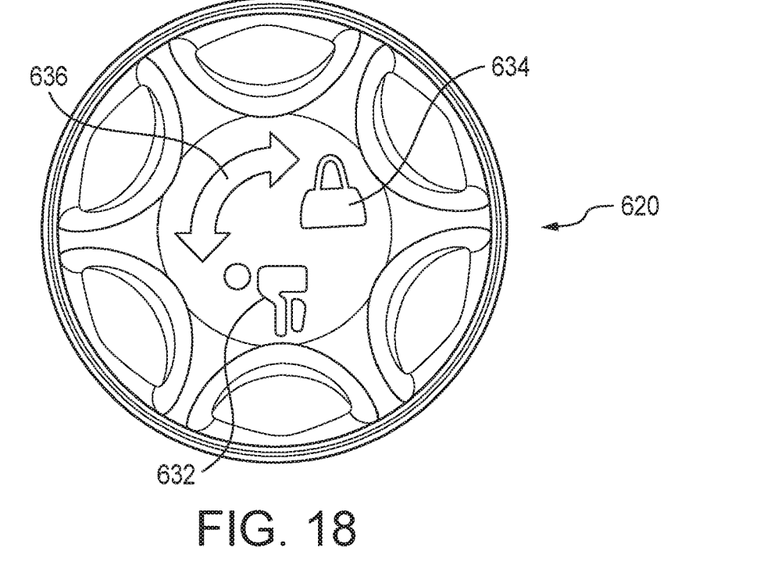
FIG. 18 is a bottom view of an embodiment of a knob of the adjustable center cover section.
Figure 19:
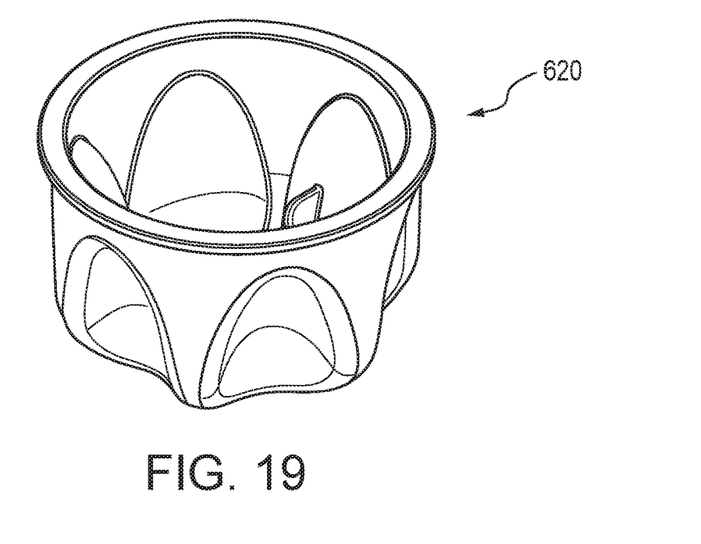
FIG. 19 is a perspective view of the embodiment of the knob of the adjustable cover section.

FIGS. 6 and 18-19 illustrate a knob 620 for selectively rotating the rotatable carrier 600. The knob 620 rests against a flange 622 located on a bottom side 624 of the under cover 606 on an inner surface 628 of a hole 626 in the under cover 606. The knob 620, in turn, is securely attached to the rotatable carrier 600 by a fastener 630, which enables a user to rotate the rotatable carrier 600 by rotating the knob 620, which in turn allows the user to move the adjustable center cover section 302 between the first and second positions as illustrated in FIGS. 3-5. The knob 620 may include first indicia 632 to indicate to the user of the vehicle which knob 620 position, when rotated, will place the adjustable center cover section 302 in the first position and second indicia 634 to indicate to the user of the vehicle which knob 620 position, when rotated, will place the adjustable center cover section 302 in the second position. Additional indicia 636 may be provided to show a user which way to rotate the knob 620, such as an arrow as illustrated in FIG. 18.

While the embodiments disclosed herein are related to a center console of a motor vehicle, the adjustable cover 302 may also be applied to any cover 124 for a storage receptacle, including, but not limited to, coolers, boxes, storage containers, and the like.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A center console for a vehicle, comprising:
   a base;
   a storage compartment disposed within the base having an upwardly facing opening; and
   a cover hingedly connected to the base for selectively covering the opening of the storage compartment, the cover comprising:
      an outer cover section;
      an adjustable center cover section disposed within the outer cover section, the adjustable center cover section movable between a first position and a second position;
      wherein an upper surface of the adjustable center cover section is flush with an upper surface of the outer cover section when the adjustable center cover section is in the first position; and
      wherein the upper surface of the adjustable center cover section is vertically recessed from the upper surface of the outer cover section when the adjustable center cover section is in the second position.

2. The center console of claim 1 wherein the cover further comprises:
an under cover; and
a height adjustment actuator disposed between the under cover and the adjustable center cover section.

3. The center console of claim 2 wherein the height adjustment actuator comprises:
a rotatable carrier rotatable about a central axis, the rotatable carrier having at least one helical guide rail disposed in a vertical wall of the rotatable carrier, a lower surface of the adjustable center cover section in engagement with a horizontal top surface of the rotatable carrier.

4. The center console of claim 3 wherein the adjustable center cover section comprises:
at least one clip extending from the lower surface, the clip having an inwardly extending engagement pin inserted into the at least one helical guide rail, wherein the at least one clip raises the adjustable center cover section as the rotatable carrier is rotated clockwise and the engagement pin moves up the helical guide rail, and the at least one clip lowers the adjustable center cover sections as the rotatable carrier is rotated counterclockwise and the engagement pin moves down the helical guide rail.

5. The center console of claim 4 wherein the adjustable center cover section further comprises:
at least one outwardly extending pin, the outwardly extending pin being receivable and movable in a slot in the outer cover section.

6. The center console of claim 5 wherein the adjustable center cover section further comprises:
a knob attached to the rotatable carrier for rotating the rotatable carrier between the first position and the second position.

7. The center console of claim 6 wherein the knob further comprises:
indicia indicating the first position and the second position to a user of the knob.

8. A cover for a storage receptacle, comprising:
an outer cover section;
an adjustable center cover section disposed within the outer cover section, the adjustable center cover section movable between a first position and a second position;
wherein an upper surface of the adjustable center cover section is flush with an upper surface of the outer cover section when the adjustable center cover section is in the first position; and
wherein the upper surface of the adjustable center cover section is vertically recessed from the upper surface of the outer cover section when the adjustable center cover section is in the second position.

9. The cover of claim 8 further comprising:
an under cover; and
a height adjustment actuator disposed between the under cover and the adjustable center cover section.

10. The cover of claim 9 wherein the height adjustment actuator comprises:
a rotatable carrier rotatable about a central axis, the rotatable carrier having at least one helical guide rail disposed in a vertical wall of the rotatable carrier, a lower surface of the adjustable center cover section in engagement with a horizontal top surface of the rotatable carrier.

11. The cover of claim 10 wherein the adjustable center cover section comprises:
at least one clip extending from the lower surface, the clip having an inwardly extending engagement pin inserted into the at least one helical guide rail, wherein the at least one clip raises the adjustable center cover section as the rotatable carrier is rotated clockwise and the engagement pin moves up the helical guide rail, and the at least one clip lowers the adjustable center cover sections as the rotatable carrier is rotated counterclockwise and the engagement pin moves down the helical guide rail.

12. The cover of claim 11 wherein the adjustable center cover section further comprises:
at least one outwardly extending pin, the outwardly extending pin being receivable and movable in a slot in the outer cover section.

13. The center console of claim 12 wherein the adjustable center cover section further comprises:
a knob attached to the rotatable carrier for rotating the rotatable carrier between the first position and the second position, the knob including indicia indicating the first position and the second position to a user of the knob.

14. An actuator for raising and lowering an adjustable center cover section disposed within an outer cover section of a cover for a storage receptacle, the adjustable center cover section movable between a first position and a second position, comprising:
a rotatable carrier rotatable about a central axis, the rotatable carrier having at least one helical guide rail disposed in a vertical wall of the rotatable carrier, a lower surface of the adjustable center cover section in engagement with a horizontal top surface of the rotatable carrier.

15. The actuator of claim 14 wherein the adjustable center cover section comprises:
at least one clip extending from the lower surface, the clip having an inwardly extending engagement pin inserted into the at least one helical guide rail, wherein the at least one clip raises the adjustable center cover section as the rotatable carrier is rotated clockwise and the engagement pin moves up the helical guide rail, and the at least one clip lowers the adjustable center cover sections as the rotatable carrier is rotated counterclockwise and the engagement pin moves down the helical guide rail.

16. The actuator of claim 15 further comprising:
a knob attached to the rotatable carrier for rotating the rotatable carrier between the first position and the second position.

* * * * *